Oct. 10, 1967 A. CSICSATKA 3,346,699

STEREOPHONIC RADIO CIRCUIT INCLUDING PHASING CIRCUIT
FOR PROVIDING RECONSTITUTED SUBCARRIER SIGNAL
Filed Oct. 23, 1964

INVENTOR:
ANTAL CSICSATKA,

BY Norman C. Fulmer
HIS ATTORNEY.

United States Patent Office 3,346,699
Patented Oct. 10, 1967

3,346,699

STEREOPHONIC RADIO CIRCUIT INCLUDING PHASING CIRCUIT FOR PROVIDING RECONSTITUTED SUBCARRIER SIGNAL

Antal Csicsatka, Utica, N.Y., assignor to General Electric Company, a corporation of New York Filed Oct. 23, 1964, Ser. No. 405,904
3 Claims. (Cl. 179—15)

This invention relates to stereophonic radio reception, and particularly to receiver circuits used in connection with demodulation of the "composite" stereo signal.

In the standardized FM stereo system, audio signals L and R, which represent respectively the audio signals generated by left and right microphones, for example, are transmitted by modualting the frequency of the main carrier in accordance with the amplitude variation of the sum of the two signals, i.e., $L+R$, and the main carrier also is frequency modulated with the amplitude variations of the sideband products resulting from an amplitude modulation of a 38 kilocycle per second subcarrier with a difference combination of the two stereo signals, i.e., $L-R$. The 38 kilocycle subcarrier is suppressed so that it does not accompany the other components of the broadcast signal. A subharmonic 19 kilocycle pilot signal of relatively small amplitude is transmitted on the main carrier, in a frequency gap between the $L+R$ signal and the $L-R$ sidebands, and functions as a reference signal at receivers for reconstituting a signal at the 38 kilocycle subcarrier frequency.

The combination of the $L+R$ signal, the $L-R$ sidebands of the suppressed subcarrier, and the pilot signal, is called the "composite" signal.

In receivers, a stereo demodulator circuit derives the separate L and R audio signals from the composite signal. In one type of stereo demodulator circuit, one of the stereo signals is derived by sampling the composite signal at times corresponding to the positive excursions of the 38 kilocycle suppressed subcarrier, and the other stereo signal is derived by sampling the composite signal at times corresponding to the negative excursions of the 38 kilocycle subcarrier wave. This sampling is performed by a sampling circuit that is controlled by a 38 kilocycle reconstituted subcarrier or switching signal derived in a switching signal generator from or under the control of the pilot signal. For example, if samples of the left stereo signal L are obtained during excursions of the switching signal corresponding in time to positive excursions of the subcarrier, then samples of the right stereo signal R are obtained during excursions of the switching signal corresponding in time to negative excursions of the subcarrier. Each of the signals L and R is then frequency de-emphasized, if they have been pre-emphasized at the transmitter (in well-known manner), so as to yield the original audio signals L and R at separate outputs for application (after amplification if desired) to separate "left" and "right" loudspeakers.

An alternative stereo demodulator circuit for deriving the L and R signals employs, instead of a time sampling arrangement, an AM detector for deriving the $L-R$ signal from the composite signal, and a matrix circuit for combining the $L+R$ and $L-R$ signals additively and subtractively, which provides the L and R output signals.

In order for the stereo demodulator circuit to function properly, the various signal components of the composite signal, and the reconstituted subcarrier or switching signal must be applied thereto with proper relative amplitudes and phases. Circuitry for accomplishing this represents a relatively critical and costly portion of the stereo reception circuit.

An object of the invention is to provide improved circuitry for reception of stereophonic signals.

Other objects are to provide improved stereo receiver circuitry which is reliable, easily adjusted, inexpensive, and which achieves excellent performance.

Other objects will be apparent from the following disclosure and claims, and from the accompanying drawing.

The invention comprises, briefly and in a preferred embodiment, a split-load composite signal amplifier having a first output load circuit comprising a resistor and a parallel resonant circuit connected in series, the resistor providing an amplified composite signal and the parallel resonant circuit, which is resonant at the pilot signal frequency, providing a relatively more greatly amplified pilot signal. A second output load circuit of the split-load amplifier provides an amplified composite signal in opposite phase with respect to the amplified composite signal at the first output circuit. A second parallel resonant circuit, resonant at the pilot signal frequency, is coupled to the first parallel resonant circuit by means of a capacitor and a resistor connected in series and having values to provide a compensatory phase shift to the pilot signal. This second resonant circuit is connected to a control electrode of an amplifier device which is normally in the cut-off or non-conductive condition. A circuit having parallel resonance at the subcarrier frequency is connected to an output electrode of the amplifier device, and produces a reconstituted subcarrier or switching signal in response to and under control of the pilot signal. The amplified composite signal from the aforesaid first output load circuit, and the reconstituted subcarrier or switching signal, which are in exact and proper phase with respect to each other due to the aforesaid compensatory phase shift, are applied to a demodualtor circuit which derives the L and R signals from the composite signal. The opposite-phase composite signal from the aforesaid second output load circuit of the amplifier, is combined with the L and R output signals of the demodulator, in order to cancel out undesired cross-talk components in the L and R output signals.

Figures 1, 2, 3:
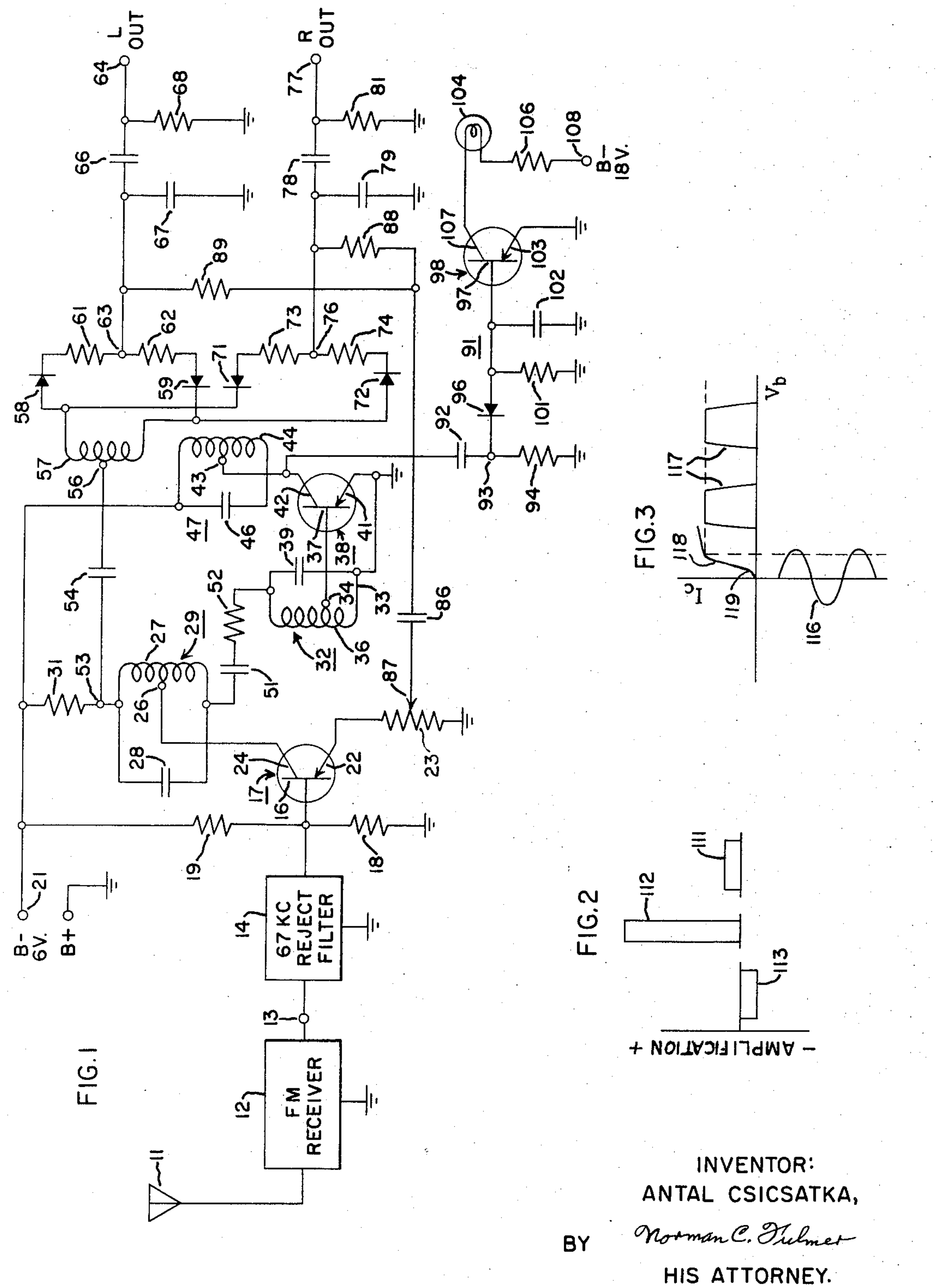
FIGURE 1 is an electrical schematic diagram of a preferred embodiment of the invention.
FIGURE 2 is a chart showing the relative amplitudes and polarities of output signals of the composite signal amplifier.
FIGURE 3 is a plot of operating characteristics of the switching signal oscillator.

Now referring to the circuit of FIGURE 1 in the drawing, an antenna 11 picks up the FM stereo signal in a normal manner, and applies it to an FM receiver circuit 12 which normally includes a mixer circuit, intermediate amplifier stages, and a demodulator of the limiter-discriminator type or ratio-detector type. The output of the FM receiver 12 comprises, at the output terminal 13 thereof, the composite signal which comprises the $L+R$ signal combination in a range of some 50 to 15,000 cycles per second, a pilot signal at 19 kilocycles per second, and $L-R$ sidebands of a suppressed amplitude modulated subcarrier, these sidebands extending between 23 kc. and 53 kc. The signal at output terminal 13 also might include a commercial program signal in the vicinity of 67 kc.

The signals are fed, from terminal 13, through a 67 kc. reject filter 14 which rejects the commercial program signal, and the FM stereo composite signal is then fed to the base 16 of an amplifier transistor 17. A resistor 18 is connected between the base 16 and electrical ground, and a resistor 19 is connected between the base 16 and a terminal 21 of operating voltage, which in the example shown is 6 volts, negative polarity. The emitter electrode 22 of transistor 17 is connected to electrical ground through a potentiometer 23, and the collector electrode 24 is connected to a tap 26 of an inductor 27 which is connected in parallel with a capacitor 28 so as to form a resonant circuit 29 which is resonant at the 19 kilocycle pilot signal frequency. A load resistor 31 is connected between an end of the resonant circuit 29 and the voltage terminal 21.

A second resonant circuit 32, which is resonant at the 19 kilocycle pilot signal frequency, has an end 33 thereof connected to electrical ground, and a tap 34 on the inductor 36 of this resonant circuit is connected to the base 37 of an amplifier transistor 38 which normally is in the cut-off or non-conductive condition. A capacitor 39 is connected in parallel with the inductor 36 to provide the aforesaid resonant circuit 32. The emitter electrode 31 of transistor 38 is electrically grounded, and the collector 42 is connected to a tap 43 of an inductor 44 which is connected in parallel with a capacitor 46 to provide a resonant circuit 47 which is resonant at the 38 kilocycle frequency of the suppressed subcarrier and of the switching signal that is produced in the resonant circuit 47 as will be described hereafter. An end of the resonant circuit 47 is connected to the voltage supply terminal 21.

Normally, the resonant circuits 29 and 32 would be coupled together either inductively or capacitively. In the case of capacitive coupling, a 90 degree phase shift will occur between the signals in the two resonant circuits. In accordance with the invention, the resonant circuits 29 and 32 are coupled together by means of a time delay network, preferably comprising a series-connected capacitor 51 and a resistor 52, this series combination being connected between the otherwise free ends of the resonant circuits 29 and 32. This novel coupling not only couples the two 19 kilocycle resonant circuits for applying the 19 kc. signal from circuit 29 to circuit 32, but also provides a desired amount of phase shift, and achieves other advantages, as will be described later.

The junction 53 of the load resistor 31 and the resonant circuit 29 is coupled via a capacitor 54 to the center tap 56 of a demodulator input winding 57 which is inductively coupled to the inductor 44 of the 38 kilocycle resonant circuit 47. The stereo demodulator circuit, which in the embodiment shown in the drawing is of the time-sampling type, includes a "left" signal sampling circuit comprising a pair of diodes 58 and 59 having unlike electrodes connected respectively to the ends of the winding 57. A pair of load resistors 61 and 62 are connected in series between the remaining electrodes of diodes 58 and 59, and the junction 63 thereof is connected to a "left" signal output terminal 64 via a capacitor 66. A capacitor 67 is connected between the junction point 63 and electrical ground. A resistor 68 is connected between the left output terminal 64 and electrical ground. The capacitor 67, in conjunction with the load resistors 61 and 62, forms a de-emphasis circuit for the audio signal.

Similarly, a "right" signal sampling circuit comprises a pair of diodes 71 and 72 having unlike electrodes connected respectively to the ends of the winding 57, these electrodes being unlike the electrodes of the diodes 58 and 59 which also are connected to the winding 57, as shown. Load resistors 73 and 74 are connected in series between the remaining electrodes of the diodes 71 and 72, and the junction 76 thereof is connected to a "right" signal output terminal 77 via a capacitor 78. A capacitor 79 is connected between the junction point 76 and electrical ground, and, in conjunction with the load resistors 73 ad 74, provides a de-emphasis circuit for the "right" stereo audio signal. A resistor 81 is connected between the "right" output terminal 77 and electrical ground. The pilot signal, in the composite signal which is demodulated, has such a small amplitude and such a high (superaudible) frequency that its presence is immaterial.

A coupling capacitor 86 is connected between the adjustable tap 87 of potentiometer 23 and an end of each of resistors 88 and 89, the remaining ends of these resistors being respectively connected to the junction points 76 and 63 of the demodulator channels.

A stereophonic pilot lamp circuit 91 comprises a coupling capacitor 92 connected between the collector 42 of oscillator transistor 38 and an input point 93. A resistor 94 is connected between the input point 93 and electrical ground. A rectifier 96 is connected between the input point 93 and the base 97 of a transistor 98. A resistor 101 and capacitor 102 are connected in parallel between the base electrode 97 and electrical ground. The emitter 103 of transistor 98 is connected to electrical ground. A stereo reception indicator lamp 104 and a resistor 106 are connected in series between the collector electrode 107 of transistor 98 and a terminal 108 of a voltage source, which in the example shown comprises 18 volts of negative polarity with respect to electrical ground.

The circuit of FIGURE 1 functions as follows. The transistor 17 functions as a split-load amplifier, having a first output load circuit comprising the 19 kc. pilot signal resonant circuit 29 and the load resistor 31 connected in series, and a second output load circuit consisting of the potentiometer 23. The resistance value of potentiometer 23 is about the same as that of the resistance load 31. A greatly amplified pilot signal appears across the resonant circuit 29, and composite signals, of opposite polarity and having little or no amplification, appear respectively across the load resistor 31 and the potentiometer 23. FIGURE 2 illustrates the relative phase relationship and power amplification of these signals in a comparative manner, 111 representing the composite signal gain, this signal appearing across the load resistor 31; 112 representing the much greater pilot signal gain, this signal appearing across the resonant circuit 29; and 113 representing the gain of the oppositely phase composite signal which appears across potentiometer 23. Preferably, the amplifier gain for the pilot signal 112 is approximately twenty or thirty times as great as the amplifier gain for the composite signals 11 and 113. Thus, as will be seen, the amplifier circuit provides the signals, in relative amplitudes and polarities as shown in FIGURE 2, suitable for proper functioning of the circuit without requiring any further amplification or polarity reversal. Due to the negative feedback provided in the amplifier circuit by the emitter resistance 23, the input impedance of the transistor 17 becomes increased, which is highly desirable in that it permits the 67 kc. reject filter 14 to be more economical to construct, and also properly matches the relatively high output impedance of the FM receiver 12.

The second pilot frequency resonant circuit 32 provides increased selectivity for selecting the pilot signal and helps to prevent any extraneous signals from operating the frequency-doubler amplifier transistor 38. Normally, the pilot signal resonant circuit inductors 27 and 36 would be inductively or capacitively coupled together in order to apply the pilot signal to the circuit 32, and, in order to insure correct phasing of the switching signal and composite signal inputs to the demodulator input winding 57, one or both of the resonant circuits 29 and 32 would be tuned slightly off resonance in order to achieve this proper phasing. The need for this phase correction arises from the fact that the *L—R* sidebands, being higher in frequency than the pilot signal, tend to become delayed with respect to the pilot signal in the circuitry of the FM receiver 12, in the 67 kc. reject filter 14, and in other circuitry prior to the stereo demodulator diodes, whereupon the switching signal produced under control of the pilot signal will not be in the required exact phase with the *L—R* sidebands at the stereo demodulator diodes 58, etc.

In accordance with a feature of the invention, the pilot signal from circuit 29 is coupled to circuit 32 by a time-delay network such as the series-connected capacitor 51 and resistor 52, which function to delay the 19 kc. pilot signal sufficiently to achieve the required correct phasing of the composite signal and switching signal at the input winding 57 of the demodulator circuitry. The capacitor 51 is given a small enough value so that the coupling between the resonant circuits 29 and 32 is at the critical value or less, so that these two circuits can be tuned independently without there being any interaction between them—i.e., each of the resonant circuits 29 and 32 need be adjusted only once, since the tuning of neither affects the other. The value of resistor 52 is chosen so that, in conjunction with capacitor 51, the pilot signal is delayed an amount to insure that the switching signal produced in resonant circuit 47 will be in exact phase with the composite signal applied to the center tap 56 of the demodulator input winding 57. For example, capacitor 51 may have a value of 33 micro-microfarads and resistor 52 may have a value of 100,000 ohms. The improved circuitry, in addition to improving the selection of the pilot signal and exclusion of undesired signals, and avoidance of interaction of tuning between the resonant circuits 29 and 32, also permits the resonant circuits 29 and 32 to each be easily peak-tuned to 19 kc., and there is no necessity for the difficult task of de-tuning one or both circuits in order to provide proper pilot signal phasing as has been necessary in the past. Furthermore, since the phase correction and pilot signal coupling elements 51 and 52 are connected between the two constant-impedance resonant circuits 29 and 32, rather than being connected directly to any electrodes of transistors, and since the transistor base electrode 37 is tapped well down on the winding 36, the amount of pilot signal phase shift is substantially constant and unaffected by any changes in transistor current as would be the case if the coupling circuit comprising elements 51 and 52 were connected directly to a transistor electrode.

The amplifier transistor 38, which is connected so as to have no fixed bias between its base and emitter electrodes, is normally in the cut-off condition, i.e., no current flows in the collector 42. The amplifier functions as illustrated in FIGURE 3, in which the wave 116 represents the 19 kilocycle pilot signal applied to the base 37, and the half-cycle 19 kilocycle wave train 117 appears at the collector electrode 42 due to the transistor 38 being normally cut off. Due to the relatively great pilot signal amplification achieved by the preceding amplifier 17, the pilot signal 116 drives the transistor 38 into saturation during each half-cycle, so that the output half-cycles 117 are distorted due to having flattened tops. Thus, the 19 kc. half-waves 117 are rich in second harmonic content, so as to generate in the 38 kc. tuned circuit 47 a 38 kc. switching signal of adequate magnitude to properly switch the demodulator diodes 58, 59, 71, and 72 via its inductive coupling to the demodulator input winding 57. As shown in FIG. 3, the characteristic curve 118 has a lower knee 119, whereby the amplifier is immune to noise signals in the vicinity of 19 kc., which cannot overcome this threshold, and hence the circuit will not falsely respond to typical noise signals.

Whenever a stereo signal is received, and the frequency-doubling amplifier 38 and resonant circuit 47 produce the switching signal, the stereo indicator light 104 lights up, due to the stereo signal being rectified by the rectifier 96 so as to bias the normally "off" transistor 98 into conduction so that its collector current causes lamp 104 to light. The filter capacitor 102 not only filters the rectified 38 kc. signal produced by the rectifier 96, but also functions as a time delay to prevent actuation of the pilot light by intermittent noise pulses. False actuation of the lamp 104 by noise is further prevented by the above-described noise threshold 119 in the amplifier 38.

The L and R output signals at terminals 64 and 77 tend to have a small amount of cross-talk; i.e., the L signal is accompanied by a small component of R, and the R signal is accompanied by a small amount of L. These undesired cross-talk components are relatively greater at the higher audio frequencies. The capacitor 86 and resistors 88 and 89 apply the composite signal from resistor 23 to the L and R signal points 63 and 76. All but the sum signal component of this composite signal are immaterial because they are superaudible, and the sum signal component, being of opposite phase with respect to the L and R output signals due to the aforesaid functioning of the amplifier 17, cancels out the undesired cross-talk components. Optimum cross-talk cancellation is achieved by adjustment of the potentiometer tap 87. This cross-talk cancellation reduces the amplitudes of the desired L and R output signals only slightly. For improved cross-talk cancellation, capacitor 86 is given a value to pass the higher $L+R$ audio frequencies more than the lower audio frequencies, whereby the relatively greater amplitude cross-talk components at the higher audio frequencies are more effectively cancelled, as disclosed and claimed in patent application Ser. No. 334,942, filed Dec. 31, 1963 now Patent No. 3,272,923, by the same inventor and assigned to the same assignee as the present patent application.

It has been found that the above-described relatively simple two-transistor stereo demodulator drive circuit performs exceedingly well, due to the accurate phasing of the switching signal, is easy to adjust because each of the tuned circuits is simply peak-tuned to the proper signal frequency, and the circuit also is stable, reliable, and relatively inexpensive because of the multiple functioning of the amplifier 17 and the effective frequency-doubling and stereo-light activation functions of the amplifier 38. While in the preferred embodiment of the invention, the amplifier 17 and associated circuitry, the pair of pilot signal resonant circuits 29, 32 coupled by the phase shifting network, and the oscillator circuit 38, 47 function together as an integral whole, each of these component circuits is meritorious in itself and conceivably could be used advantageously in combination with circuits other than shown in the preferred embodiment of the invention.

Although a preferred embodiment and sub-combinations of the invention have been shown and described, various other embodiments and modifications thereof will be apparent to those skilled in the art and will fall within the scope of invention as defined in the following claims.

What I claim is:

1. A circuit for deriving stereo signals from a composite signal including as frequency components thereof a sum combination of the stereo signals, a difference combination of the stereo signals amplitude modulated on a suppressed carrier of given frequency, and a pilot signal at a frequency of one-half said given frequency and lying in a frequency gap between said sum and difference combinations of stereo signals, said circuit comprising a split-load amplifier having an input electrode adapted to have said composite signal applied thereto and having first and second load circuits connected thereto in a split-load arrangement, said first load circuit comprising a resistor and a first parallel resonant circuit connected in series and said second load circuit comprising a resistance element, said first parallel resonant circuit being resonant at the frequency of said pilot signal, whereby an amplified composite signal is provided in said resistor, a relatively more greatly amplified pilot signal is provided in said first parallel resonant circuit, and a composite signal is provided in said resistance element and having opposite phase with respect to said composite signal provided in said resistor, a second parallel resonant circuit resonant at the frequency of said pilot signal, a time delay network connected between said first and second parallel resonant circuits to apply said amplified pilot signal from the first to the second parallel resonant circuit, an amplifier device normally in the cut-off condition and having an input electrode connected to said second parallel resonant circuit and having an output electrode, a third parallel resonant circuit resonant at said given frequency of the suppressed carrier and connected to said output electrode, said amplifier device being adapted to be driven into conduction by alternate half-cycles of the pilot signal from said second parallel resonant circuit whereby a signal of said given frequency is produced in said third parallel resonant circuit, a stereo demodulator circuit having an input circuit connected to receive said amplified composite signal from said resistor and also connected to receive said signal of given frequency from said third parallel resonant circuit, said time delay network having a value of time delay to cause said signal of given frequency at said input circuit to be in the same phase as said suppressed carrier with respect to said difference combination of stereo signals, said stereo demodulator circuit having two output circuits and being adapted to derive said stereo signals from said composite signal under the control of said signal of given frequency and provide said derived stereo signals respectively at said output circuits, and means for applying at least a portion of the sum combination signal from the composite signal at said resistance element to said first and second output circuits, respectively.

2. A circuit as claimed in claim 1, in which said time delay network comprises a capacitor and a resistor connected in series between said first and second parallel resonant circuits, said capacitor having a value of capacitance to provide no more than critical coupling between said first and second parallel resonant circuits for said pilot signal thereby permitting independent tuning thereof without interaction therebetween, and said resistor having a value of resistance which, in conjunction with said capacitance, provides said value of time delay.

3. A circuit for deriving stereo signals from a composite signal including as frequency components thereof a sum combination of the stereo signals, a difference combination of the stereo signals amplitude modulated on a suppressed carrier of given frequency, and a pilot signal at a frequency of one-half said given frequency and lying in a frequency gap between said sum and difference combinations of stereo signals, said circuit comprising a first parallel resonant circuit connected to receive said composite signal and resonant at the frequency of said pilot signal, a second parallel resonant circuit resonant at the frequency of said pilot signal, a time delay network comprising a capacitor and a resistor connected in series between said first and second parallel resonant circuits to apply the pilot signal with time delay from the first to the second parallel resonant circuit, and electrical circuitry connected to receive said composite signal and also to receive said pilot signal from said second parallel resonant circuit and adapted to provide said stereo signals therefrom, said capacitor having a value of capacitance to provide no more than critical coupling between said first and second parallel resonant circuits for said pilot signal thereby permitting independent tuning thereof without interaction therebetween, and said resistor having a value of resistance which, in conjunction with said capacitance, provides a delay of said pilot signal for achieving optimum functioning of said electrical circuitry.

References Cited

UNITED STATES PATENTS

| | | | |
|---|---|---|---|
| 3,116,372 | 12/1963 | Wolff | 179—15 |
| 3,133,993 | 5/1964 | De Vries | 179—15 |
| 3,167,615 | 1/1965 | Wilhelm et al. | 179—15 |
| 3,209,270 | 9/1965 | De Vries | 179—15 |
| 3,225,143 | 12/1965 | Parker | 179—15 |

OTHER REFERENCES

Hatke: RCA Technical Notes, "Automatic Phase Lock for Stereo Multiplex Detector," March 1964, No. 575. Call No. 655.R2t.

Crowhurst: Audio, "Filters for FM-Stereo," August 1961. Pages 26–28, 32 and 34 relied on. Call No. TK 6540. R123.

JOHN W. CALDWELL, *Acting Primary Examiner.*

R. L. GRIFFIN, D. G. REDINBAUGH,
*Assistant Examiners.*